United States Patent [19]

Fujii et al.

[11] 4,311,810
[45] Jan. 19, 1982

[54] BLOCK COPOLYMERS OF PROPYLENE AND 4-METHYL-1-PENTENE

[75] Inventors: Masaki Fujii; Mitsutaka Miyabayashi, both of Yokkaichi; Hironori Todaka; Yoshihiro Ishizaki, both of Suzuka, all of Japan

[73] Assignee: Mitsubishi Petrochemical Co., Ltd., Japan

[21] Appl. No.: 136,548

[22] Filed: Apr. 2, 1980

[30] Foreign Application Priority Data

Apr. 11, 1979 [JP] Japan ................................. 54-43809
Jun. 12, 1979 [JP] Japan ................................. 54-73807

[51] Int. Cl.³ .......................................... C08F 297/08
[52] U.S. Cl. ............................. 525/321; 260/33.6 PQ; 426/126; 428/161; 525/53; 525/247; 525/333; 526/79; 526/347; 526/348.6; 526/916; 528/481
[58] Field of Search ................. 525/321, 333; 526/79, 526/348.6, 347

[56] References Cited

U.S. PATENT DOCUMENTS

| | | | |
|---|---|---|---|
| 3,230,276 | 1/1966 | Peters et al. | 526/347 |
| 3,457,246 | 7/1969 | Cleary | 526/79 |
| 3,529,038 | 9/1970 | Chabert et al. | 526/347 |
| 3,700,639 | 10/1972 | Hulse et al. | 526/347 |
| 3,732,335 | 5/1973 | Hermans et al. | 526/79 |

FOREIGN PATENT DOCUMENTS

| | | |
|---|---|---|
| 1014886 | 12/1965 | United Kingdom . |
| 1090750 | 11/1967 | United Kingdom . |
| 1104665 | 2/1968 | United Kingdom . |
| 1107077 | 3/1968 | United Kingdom . |
| 1109863 | 4/1968 | United Kingdom . |

*Primary Examiner*—Stanford M. Levin
*Attorney, Agent, or Firm*—Robert E. Burns; Emmanuel J. Lobato; Bruce L. Adams

[57] ABSTRACT

A propylene copolymer, which comprises units of (A) propylene, (B) a monomer selected from the group consisting of branched alpha-olefins (i.e. 4-methyl-1-pentene), styrene and styrene derivatives (e.g. methyl styrene), and (C) an optional monomer selected from the group consisting of straight-chain alpha-olefins of 2 to 12 carbon atoms other than propylene (e.g. ethylene), and which is defined by its thermal analysis data on a differential scanning calorimeter; and a process for producing the copolymer. Block copolymers are preferable.

6 Claims, 2 Drawing Figures

FIG. 2

BLOCK COPOLYMERS OF PROPYLENE AND 4-METHYL-1-PENTENE

BACKGROUND OF THE INVENTION

This invention relates to soft and hard propylene copolymers which have excellent balance between heat resistance, impact resistance and heat fusibility or sealability and are suitable for shaping into various shaped article such as films, sheet, bottles, injection molded articles, flat yarn and the like, and to a process for producing the same. More specifically, this invention relates to the same copolymers having a primary structure of increased nonuniformity with substantial improvement of the above described characteristics, and to a process for producing this type of copolymers.

The homopolymer of propylene has been widely used as a general purpose resin largely developed by taking advantage of its characteristics such as suitably high heat resistance and relatively good optical properties. However, this homopolymer has inherent defects and even some of its properties considered to be advantageous are not fully satisfactory. In order to eliminate these defects and disadvantages, a number of its copolymers with various comonomers, in particular with alpha ($\alpha$)-olefins, have been studied.

Among studies of copolymers with $\alpha$-olefins, studies involving copolymers with ethylene are the most numerous, and these studies are aimed at the improvement of characteristics of propylene homopolymer, such as impact-withstanding strength, transparency, heat fusibility and the like. Considerable success has been achieved in improving impact-withstanding strength, but other properties or propylene homopolymer are not always sufficiently improved.

Research has been carried out on the copolymers of propylene with straight chain $\alpha$-olefin such as 1-butene, 1-hexene, 1-octene, and the like, and with branched chain $\alpha$-olefins such as 4-methyl-1-pentene. When these comonomers are introduced at random into the polypropylene chain, they tend to disturb the crystal structure of polypropylene, and the disturbance greater than that caused by introducing ethylene. Therefore, these $\alpha$-olefins have been considered more effective than ethylene for softening polypropylene or increasing the heat fusibility thereof. On the other hand, however, the relatively high heat resistance which is possessed by polypropylene is sacrificed.

As is clear from above, though the defects of propylene and the advantages thereof which are not always sufficient have been eliminated or improved by copolymerization with various $\alpha$-olefins, the heat resistance of propylene has been generally degraded. Accordingly, if the improvement of heat resistance together with that of other characteristics can be realized, polypropylene will be able to enter many fields of use where it has been considered unusable. This will be very significant in industry.

SUMMARY OF THE INVENTION

We have studied ways to increase further the heat resistance inherent in the homopolymer of propylene while at the same time improving the heat fusibility and the impact-withstanding strength which are usually susceptible to deterioration. As a result, we have found that such simultaneous improvement of various characteristics mentioned above, which have been considered difficult is possible by causing propylene to copolymerize with specific $\alpha$-olefins by a specific copolymerizing mode, such as to increase the nonuniformity of the primary structures of the propylene copolymers. This invention is based on this discovery.

The propylene copolymers according to the invention are, in their broadest aspect, characterized in that they consist essentially (A) propylene, (B) a monomer selected from the group consisting of branched $\alpha$-olefins of 5–12 carbons and styrene or derivatives thereof, and if necessary (C) a straight-chain $\alpha$-olefin of 2–12 carbon atoms other than propylene under the conditions mentioned below:

(a) the content of monomer (B) is in the range of 2–90% by weight, (b) the content of monomer (C) is in the range of 0–8% by weight, (c) the limiting viscosity of the propylene copolymer in decalin at 135° C. is 0.5–15 d 1/g, and (d) at least one peak of the fusion curve obtained by a differential scanning calorimeter (DSC) is located at or above 145° C., or each of the quantities of heat of fusion of portions which melt at or under 140° C. and at or above 150° C. is 5% or more of the total heat of fusion, said quantities of heat of fusion of respective portions being calculated from the fusion curve obtained by the differential scanning calorimeter (in this case, the fusion curve by the DSC is obtained by measuring at a heating rate of 10° C./min. a sample crystallized through a cooling rate of 10° C./min.)

The process for producing the propylene copolymers in its broadest aspect, is characterized in that the copolymerization of (A) propylene and (B) a monomer selected from the group consisting of branched $\alpha$-olefins of 5–12 carbon atoms and styrene and derivatives thereof is carried out by using a catalyst comprising at least a titanium component and an organoaluminium compound in the presence or absence of (C) a straight-chain $\alpha$-olefin of 2–12 carbon atoms other than propylene under the condition that the ratio (R) of concentration of the monomer (B) to the concentration of propylene in the reaction system is varied in the course of copolymerization process between $R_{max}$ and $R_{min}$ wherein $R_{max}$ and $R_{min}$ are the maximum and minimum values of R in the polymerization process respectively, and $R_{max}/R_{min} > 1$.

There are many indefinite points about the reason why the copolymers according to the invention have a high heat resistance while at the same time they have excellent heat fusibility and impact-withstanding strength. However, as a result of our analysis of polymer structure by fractional extraction, analysis of fusion/crystallization characteristics by means of a DSC, the nuclear magnetic resonance method (NMR) and the infrared (IR) spectrum, we have concluded that, in addition to the specificities of the comonomers used, the nonuniformity of their primary structure constitutes particularly the principal cause of the meritorious effects obtained by the invention.

More specifically, according to the invention, the ratio of concentrations of the monomer (B) and propylene in the reaction system is varied with a factor larger than 1 in the course of copolymerization process. Accordingly, the composition of the copolymer which is being formed changes in correspondence to the continually changing feed composition. This means that the width of variation in the primary structure (chain length distribution of monomer B) of each copolymer molecule obtained through the course the the copolymerization process is considerably greater than that of a copolymer obtained under the ratio of monomer concentrations which is approximately constant from the beginning to the end of copolymerization, that is to say that the nonuniformity of the primary structure is higher according to the invention.

In general, even a copolymer obtained under a certain feed composition has a statistical chain length distribution which is determined by the ratio of copolymerization reactivity between the propylene and the monomer B. In this case, both monomer units are distributed so as to mutually considerably reduce their respective chain lengths, so that the degree of crystallization of the copolymer as a whole is also considerably decreased. Therefore, when the monomer B whose homopolymer has a higher melting point than that of the propylene homopolymer is caused to copolymerize with propylene, the effect of increasing the melting point of the copolymer cannot be expected.

On the other hand, in a copolymer having a primary structure of high nonuniformity as described above, a copolymer portion (a) comprising long chains of propylene and short chains of monomer B and another copolymer portion (b) comprising long chains of monomer B and short chains of propylene constitute the extreme portions, and between them there is a third copolymer portion (c) of intermediary primary structure. Accordingly, it is expected that the former two copolymer portions have respectively properties close to those of homopolymers of propylene and mononmer B (in particular, thermal characteristics as shown by fusion curves obtained by a DSC), and in addition thereto, since the element or portion (c) of intermediary structure is also included, it is possible, by varying the structure and the ratio of monomer content in the scope of the invention to produce copolymers endowed not only with characteristics of from soft to hard natures at the same time, but also with impact-withstanding strength which is not obtainable by homopolymerization.

Further, it was found that, by using the monomer (C) as a third monomer in a smaller proportion than propylene with respect to the above mentioned copolymer comprising propylene and monomer (B), with almost no loss of the heat resistance of said binary copolymer, the heat fusibility can be increased with a softer characteristic of the copolymer afforded. This is probably due to the fact that, under these conditions of copolymerization, there is almost no destruction of the long chains of monomer B by monomer C, which effectively destroys only the long chains of propylene.

DETAILED DESCRIPTION OF THE INVENTION

1. Production of the Copolymer

(1) Catalyst

Figure 1:
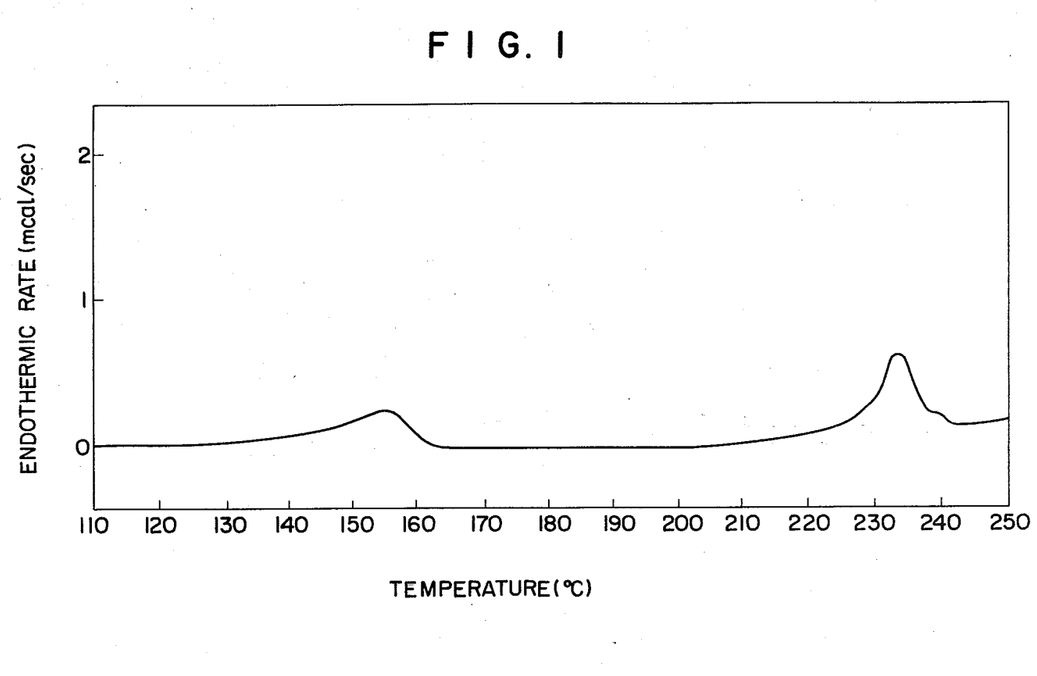
FIGS. 1 and 2 are graphs respectively showing fusion curves (endothermic rate vs. temperature) of a random copolymer produced by the process of Example A3 of the invention and a block copolymer produced by the process of Example B7 of the invention, the curves being determined from the results of analyses by means of a differential scanning calorimeter (DSC), Examples A3 and B7 being set forth hereinafter.
Figure 2:
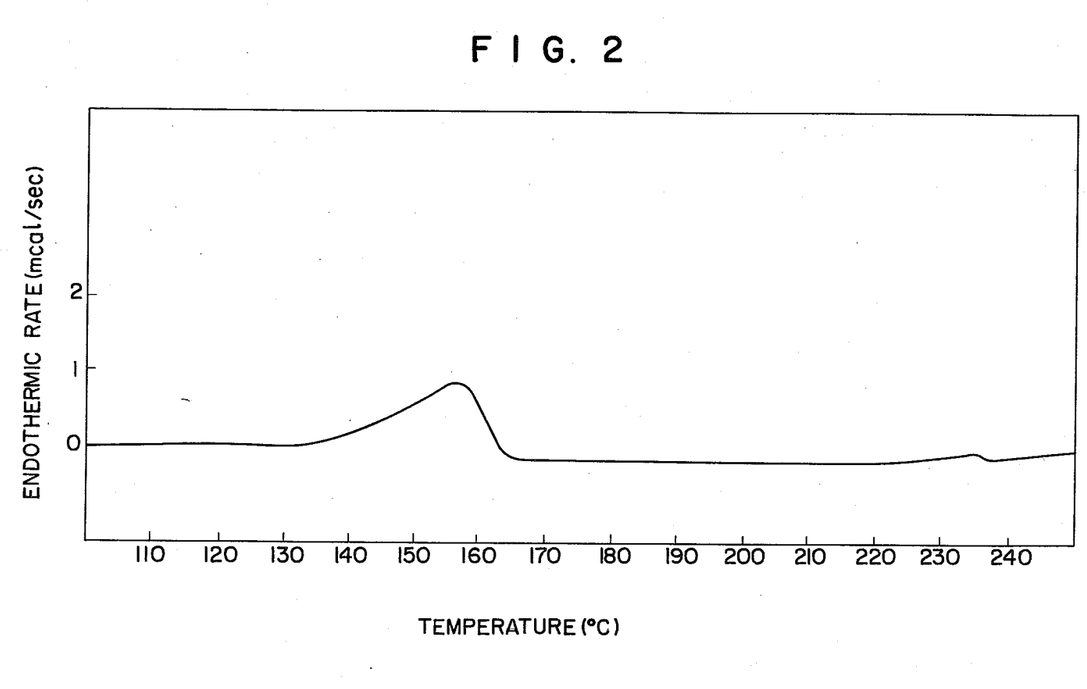

The catalyst to be used in the process according to the invention comprises at least a titanium component and an organoaluminium compound and belongs to the so-called composite catalysts of Ziegler type.

(1) Titanium component

Typical titanium components of the catalyst are various titanium trichlorides of $\alpha$, $\beta$, $\gamma$, and $\sigma$ type, and these titanium trichlorides and titanium tetrachlorides carried in various carriers based on magnesium chloride. Examples of titanium components which are advantageous due to their high activity are titanium trichloride compositions which are obtained by extracting and eliminating aluminium chloride by means of a complexing agent from eutectic composite consisting of titanium trichloride and aluminium chloride, and eutectic composite being obtained by reducing titanium tetrachloride by means of an organoaluminium compound (said titanium trichloride composition being activated by dialkyl aluminium halide when used), and various titanium trichlorides and titanium tetrachloride carried on a carrier comprising magnesium chloride (the latter titanium components being activated by trialkyl aluminium when used). Particularly, use of titanium trichloride compositions produced through complexing/extraction is most preferable because of the good granulometric properties of copolymer formed and a high introduction efficiency of monomer B into copolymer.

Besides these compositions mentioned above, all compounds which are known as having olefin polymerization capability such as, for example, various halides, alkyl halides, alkoxides, and alkoxyhalides of tetra to divalent titanium can be used in the scope of the invention.

(2) Organoaluminium compound component

Typical organoaluminium compounds which are used in combination with said titanium component are compounds expressed by the formula $AlR_mX_{3-m}$, wherein R is hydrogen or a hydrocarbon residue of ca. 1-12 carbon atoms, X is a halogen atom or alkoxy group of ca. 1-12 carbon atoms, $1 \leq m \leq 3$. Examples of this type of compound are triethylaluminium, tri-i-buthylaluminium, tri-n-octyl-aluminium, diethylaluminium halide, diethylaluminium chloride, ethylaluminium sesquichloride, ethylaluminium dichloride, and diethylaluminium iodide.

(3) Other components

By adding any of various electron-donor compounds to the above described titanium component and aluminium compound component, activity, stereoregularity, granulometric properties of formed copolymers and the like can be improved.

Various methods for such improvement are well known in this technical field.

(2) Monomer B

This component is selected from the group consisting of branched $\alpha$-olefins of 5-12 carbons and styrene and styrene derivatives. These compounds are known as monomers which impart a higher melting point to an isotactic polypropylene when they are introduced into stereoregular polymers.

Branched α-olefins are selected from compounds having the following formula.

In the formula, m is an integer from 0 to 7, $R_1$ is methyl group or ethyl group, $R_2$ is an alkyl group of 1-5 carbon atoms, or $R_1$ and $R_2$ are combined to form a cycloalkyl group, and $R_3$ is hydrogen or methyl or ethyl group. Examples of monomers expressed by the above mentioned formula are: 3-methyl-1-butene, 3-methyl-1pentene, 3-ethyl-1-pentene, 3-methyl-1-hexene, 4-methyl-1-pentene, 4,4'-dimethyl-1pentene, 4-methyl-1-hexene, 5-methyl-1-hexene, 5,5'-dimethyl-1-hexene, 3,5-dimethyl-1-hexene, 3,5,5'-trimethyl-1-hexene, vinyl cyclohexene and the like.

As for styrene derivatives, compounds having the following formula can be used:

wherein, p is 1, 2 or 3, and X is an alkyl group of 1-5 carbon atoms. Examples of this type of compound are: o-methyl styrene, m-methyl styrene, p-methyl styrene, and p-ethyl styrene.

Preferable compounds among these monomers B are 3-methyl-1-butene, 4-methyl-1-pentene, 4-methyl-1-hexene, 5-methyl-1-hexene and styrene. Particularly preferable compounds are 3-methyl-1-butene and 4-methyl-1-pentene.

(3) Monomer C

This monomer is selected from straight-chain α-olefins of 2-12 carbon atoms other then propylene. Preferable monomers are compounds having 2-6 carbon atoms, and particularly preferable monomers are those having 2 or 4 carbon atoms, that is, ethylene and 1-butene. As described above, the monomer C is used only when it is necessary to increase the heat-fusibility of formed binary compolymer of propylene and monomer B and to impart to the latter a softer characteristic with almost no loss of the heat resistance of the binary copolymer, and is not an indispensable monomer.

(4) Monomer composition of the reaction system

The most important factor for increasing the uniformity of primary structure of formed system (copolymer) is to change the composition of the monomers in the reaction system for the course or one cycle of the copolymerization process. The term "one cycle of copolymerization process" or "the course of copolymerization process" used herein means from the beginning to the end of a batch process in the batch-type copolymerization, and feeding-in of reactants into the first reactor to feeding-out thereof out of the last reactor in the case of continuous copolymerization irrespective of whether a single reactor is used or two or more reactors are used in series.

The most essential factor is the ratio R of concentrations between monomer B and propylene in the reaction system and the changes of this R between Rmax and Rmin and the ratio of Rmax/Rmin larger than 1, preferably greater than 1.5, most preferably greater than 2 constitute the indispensible requisites for increasing the nonuniformity of the primary structure of generated polypropylene. The manner of changing of R can be varied, for example, continuously changing in one cycle of copolymerization process, changing stepwise, changing from Rmax to Rmin, changing from Rmin to Rmax, changing so that Rmax or Rmin comes midway, and the like. Continuous or stepwise change from Rmax to Rmin is preferable.

In the case of copolymerization in a batch system, monomer B is for example fed totally for a short time period at the beginning of the batch process, so that the supply of monomer B is stopped for the subsequent long time period so as to decrease the concentration of monomer B to its minimum level at the end of polymerization process, while, on the other hand, propylene is fed so that the concentration of propylene is increased continuously or is maintained constant as the polymerization reaction proceeds.

In the case of copolymerization in a continuous system, such a method can be adopted for example that two or more reactors connected in series are used, wherein the monomer B is fed only to the first reactor while propylene is supplied into each reactor thereby to maintain a constant monomer composition in each reactor.

For the purpose of increasing further the nonuniformity of primary structure, it is effective to cause the state in reaction system corresponding to $R \leq 2$ Rmin and $R \geq 0.5$ Rmax to persist for 5% or more, preferably 7% or more, most preferably 10% or more of the average time period of copolymerization respectively in one cycle of the polymerization process. The average copolymerization time period herein used means the time period from the beginning to the end of copolymerization in the batch system and the average residence time period of the copolymer in all the reactors where the polymerization reaction is going on for the continuous system respectively.

In the case where the monomer C is used, the manner of feeding thereof must be different from that of the monomer B. That is, the ratio of concentration between the monomer C and the propylene in the reaction system is kept as constant as possible through one cycle of the copolymerization process, or even in the case of inevitable changes of the ratio, the maximum and the minimum values of the ratio are advantageously kept in the maximum/minimum range of 2.

(5) Method of polymerization

Apart from taking into consideration the above mentioned points, the method for producing copolymers according to the invention is not essentially different from the copolymerization method using a composite catalyst of Ziegler type. Since there are many documents concerning this kind of copolymerization, the details thereof are omitted herein for the sake of conciseness of description.

It is to be noted that a process of homopolymerization of propylene can be added prior to and/or after the above described copolymerization process, whereby the granulometric properties of the copolymer can be considerably improved and, at the same time, the degree of freedom of establishment of balance between stiffness and heat resistance of the copolymer produced is afforded. A quantity of formed propylene homopolymer which is 0.01 times the quantity of the copolymer produced in the subsequent or prior process is sufficient for obtaining only the former advantage, but the homopolymer must be formed in a quantity at the most 2 times that of the copolymer formed for the purpose of simultaneously obtaining both the former and the latter advantages. When homopolymer quantity is more than 2 times that of the copolymer, heat resistance and heat fusibility become insufficient in the resulting product. The range of 0.02 to 1.5 times is preferable, and that of 0.05 to 1 time is more preferable. Further, in place of this homopolymerization process of propylene, homopolymerization and/or copolymerization of ethylene can be carried out in the same manner.

More particularly, the present copolymer can comprise, at at least one end of the molecule, a block of a homopolymer of ethylene or a block of a random copolymer of ethylene and a $C_5$-$C_{12}$ branched α-olefin and optionally propylene. The branched α-olefin usually comprises 0–30%, preferably 0–20%, most preferably 0–15% by weight of the random copolymer block. Propylene usually comprises 0–30%, preferably 0–20%, most preferably 0–15% by weight of the random copolymer block. The content of the block of the homopolymer or random copolymer of ethylene is 1–50%, preferably 2–40%, most preferably 5–30% by weight of the total polymer.

The polymer blocks are produced successively. It is unavoidable that there may be some interval time between the end of production of a certain block and the beginning of production of the succeeding block in order to remove the monomer composition from the polymerization system, and to introduce a monomer composition and set up polymerization conditions for producing the succeeding block. The polymerization taing place during the interval can affect the polymerization which is to follow the interval and is thus undesired. The undesired polymerization can take place also between the end of production of the last block and deactivation of the catalyst by contacting it with water, an alcohol or an ether, when no such catalyst deactivation is conducted, separation of the polymer needed from the unpolymerized monomer. It is thus desirable to temporarily deactivate the catalyst before the succeeding polymerization is conducted or before the catalyst is finally deactivated.

Carbon monoxide or dioxide is useful as the temporary deactivator of catalyst. Introduction of a quantity of carbon monoxide or dioxide into a polymerization system containing the catalyst effectively deactivate the catalyst only for a certain period of time, and when the carbon mono- or dioxide is removed from the polymerization system the catalyst activity then revives or when the quantity of the carbon mono- or dioxide is small the catalyst activity revives in relatively a short time.

The quantity of carbon monoxide or dioxide should be at least chemically an equivalent to the quantity of the catalyst principal constituent which, when the catalyst comprises a titanium component, is titanium. The highest quantity is restricted only by the pressure resistance of the polymerization vessel. The preferable quantity in view of duration of the temporary deactivation and economics may be 10–10,000 equivalents, preferably 100–1,000 equivalents. Both of carbon monoxide and dioxide are effective. Carbon monixide appears to be more effective than carbon dioxide, but carbon dioxide is preferable in view of toxicity and inflammability. Such a temporary deactivator as carbon monoxide or dioxide is advantageous over such a "permanent" deactivator as water or an alcohol in view that the former can easily be removed from the polymerization system without contaminating the system for the succeeding polyermization.

2. Copolymer (1) Composition and molecular weight

One specific example of this copolymer is a propylene block copolymer comprising the block of the homopolymer of a monomer selected from the group consisting of monomer A and monomer B and the block of a random copolymer of at least two monomers selected from the group consisting of monomer A, monomer B and optional monomer C. This propylene block copolymer is produced through the polymerization method in which the above mentioned R value is changed stepwise.

Another specific example of this copolymer is a substantially random copolymer of monomer A, monomer B and optional monomer C. This random copolymer is produced by the method in which the value of R is changed continuously.

Unless specified otherwise, all quantities in percent (%) set forth hereinafter are by weight.

For the copolymer to exhibit its desired characteristics, the monomer B unit must be contained in a proportion of 2–90%, preferably 5–80%, more preferably 7–70%. Heat resistance of copolymer cannot be expected in the case where this content is below the lower limit, while heat fusibility and impact resistance are insufficient in the case where it is above the upper limit.

The monomer C unit may be omitted entirely, but this unit can be contained in the proportion of 8% or less, preferably 6% or less, more preferably 5% or less for the purpose of effectively improving heat fusibility and heat resistance. When the content of this monomer C unit is above the upper limit, not only is heat resistance decreased, but the particle properties of the copolymer formed also rapidly deteriorate, which makes difficult the stable operation of the copolymer producing process.

In this case, the contents of monomers B and C are respectively based on the total quantity of monomers A+B+C. It goes without saying that "monomer" herein used means the corresponding monomer unit in the copolymer.

The molecular weight of copolymer must be such that the limiting viscosity in decalin at 135° C. will be between 0.5–15 d l/g, preferably between 0.7–6.0 d l/g. Below this range, the mechanical characteristics of the copolymer formed do not reach practical levels, or the molding itself becomes impossible. In the case of a molecular weight above this range, viscoelasticity in the state of fusion deteriorates with the result that molding becomes also impossible.

(2) Thermal properties

The nonuniformity of the primary structure for providing simultaneously heat resistance, heat fusibility and impact resistance of the copolymer formed can be controlled by means of the fusion curve of the copolymer obtained by a DSC. More specifically, in the fusion curve, one or more fusion peaks should be all at or above 145° C., preferably at or above 150° C., or the heat of fusion of the portion fusing at a temperature at or below 140° C. and that of the portion fusing at 150° C. or above should be respectively 5% or more of the total heat of fusion. More preferably, one or more fusion peaks should be all at or above 150° C., or the heat of fusion of the portion fusing at 140° C. or below and that of the portion fusing at 150° C. or above should be respectively 10% of more of the total heat of fusion.

3. Block Copolymer

The block copolymers according to preferable embodiments of the invention are characterized by the fact that they are defined by the following points (1) and (2).

(1) The limiting viscosity is ranged between 0.3–15 d l/g (in decalin at 135° C.), and (2) Each block copolymer comprises (a) a 0.5–50% of propylene homopolymer portion and (b) 99.5–50% of a random copolymer portion comprising propylene and an unsaturated hydrocarbon compound (bm) selected from the group consisting of branched α-olefins of 5–12 carbon atoms, styrene and styrene derivatives.

Further, apart from the matters set forth below, these mentioned above are applied to these block copolymer according to the embodiments of the invention.

1) Block copolymers—their essential properties

(1) Composition

A propylene block copolymer according to the invention comprises (a) a propylene homopolymer portion and (b) a random copolymer portion comprising propylene and a particular unsaturated hydrocarbon compound, (that is, a branched α-olefin of 5–12 carbon atoms, or styrene or a styrene derivative, which will be described later in greater detail).

The random copolymer portion comprising propylene and a particular unsaturated hydrocarbon compound means the portion which is formed through the reaction under the condition of simultaneous presence of propylene and said unsaturated hydrocarbon. The propylene block copolymer comprising a propylene homopolymer portion and a propylene random copolymer portion means a compound which is obtained by carrying out sequentially the process for forming the propylene homopolymer portion and the process for forming the propylene random copolymer portion in the presence of the living polymer produced in the preceding homopolymerization process.

The block copolymer thus obtained could be a compound in which both the homopolymer portion and the random copolymer portion coexist in each copolymr molecular chain, a physical mixture of homopolymer molecular chains and random copolymer molecular chains, or a mixture thereof. In addition to the homopolymer portion comprising only propylene and the random copolymer portion comprising propylene and said unsaturated hydrocarbon, these portions can contain a small amount of comonomers copolymerized therewith provided that the comonomers do not change essentially the properties of each polymer portion. Further, in addition to these two essential portions, the block copolymers may contain a small amount of another polymer portion provided that the latter does not change essentially the properties of the block copolymer.

These block copolymers have limiting viscosities in a range of 0.3–15, preferably 1.3–11 d l/g (in decalin at 135° C.) and comprises 0.5–50%, preferably 2–30%, most preferably 5–20% of the homopolymer portion and 99.5–50%, preferably 98–70%, most preferably 95–80% of the random copolymer portion of propylene with said unsaturated hydrocarbon compound. When the propylene homopolymer portion content is above 50%, a remarkable increase of stiffness of the copolymer as well as a remarkable decrease of impact resistance thereof is caused, and although heat resistance at 140° C. to 160° C. is increased, the desired balance between heat resistance and softness and/or between heat resistance and impact resistance cannot be obtained. On the other hand, when the propylene homopolymer portion is less than 0.5%, almost no improvement of the balance between heat resistance and stiffness and between heat resistance and impact resistance is obtained.

The content of the unsaturated hydrocarbon compound in the block copolymer may be of any level but is usually in the range of 3–70%, preferably 5–50%, most preferably 8–40%. Further, the content of propylene in the block copolymer is usually in the range of 30–97 mol %, preferably 50–95 mol %, and most preferably 60–92 mol %.

(2) Unsaturated hydrocarbon compound (bm)

This is the same as that described hereinbefore as monomer (B).

The most preferably unsaturated hydrocarbon compounds in the block copolymer according to this embodiment of the invention are 4-methyl-1-pentene, 3-methyl-1-butene, 3-methyl-1-pentene and styrene.

(3) Crystallinity and others

In addition to the above mentioned indispensible conditions, the block copolymer according to the preferable embodiment of the invention is one which is rich in the low crystalline portion containing 10% or more, preferably 20% or more, most preferably 30% or more of a portion soluble in boiling n-heptane.

When the portion soluble in boiling n-heptane is less than 10%, not only does the copolymer formed have poor softness and impact resistance, but the effect of improving the balance between stiffness and/or impact resistance and heat resistance due to copolymerizing a small proportion of the propylene homopolymer cannot be obtained.

The portion soluble in boiling n-heptane can be obtained by extractng a sample put into a cylindrical filter paper by boiling n-heptane under reflux for 4 hours in a Soxhlet extractor.

(2) Block copolymers—thermal properties

It is preferable that, in addition to the above described conditions with respect to composition, the block copolymers according to the invention have specific thermal properties.

In the analysis by a differential scanning calorimeter (DSC) of the copolymers according to the invention, it is preferable that all the fusion peaks be located preferably at or above 145° C., more preferably at or above 50° C., or that the heat of fusion QI (cal/g-copolymer) of the portion fusing at 145° C. or above, preferably at 150° C. or above is 40% or more, preferably 30% or more, most preferably 20% or more of the total heat of fusion QII (cal/g-copolymer).

A block copolymer whose fusion peaks are at or lower than 145° C., or those in which the heat of fusion of the portion fusing at or above 145° C. is 40% or less of the total heat of fusion, has a remarkably lower heat resistance, particularly which is expressed by the deformation rate under heat and pressure at 140°–160° C. under a low load (0–3 kg/cm$^2$), so that the increase of heat resistance due to copolymerization of a small proportion of propylene homopolymer cannot be remarkably realized.

When the heat of fusion QIII (cal/g-copolymer) of the portion fusing at or below 170° C. in the DSC analysis and the content (C) of said unsaturated hydrocarbon (%) satisfy the following formula (1), the block copolymer according to the invention exhibits excellent balance between heat resistance and impact resistance and/or between heat resistance and softness:

$$QIII < 0.18(100-C) \qquad (1)$$

It is more suitable that QIII (cal/g-copolymer) be in the range of (2) and more preferably in the range of (3) as indicated below.

$$QIII < 0.16(100-C) \qquad (2)$$

$$QIII < 0.14(100-C) \qquad (3)$$

When the fusion curve according to the DSC has a plurality of peaks with the fusion peak showing the lowest temperature being at or above 145° C. and with that showing the highest temperature being at or above 170° C., the block copolymer according to the invention becomes more advantageous with respect to the balance between heat resistance and impact resistance and/or the balance between heat resistance and softness.

Further, when the heat of fusion QV (cal/g-copolymer) of the portion fusing at or above 170° C. in the DSC analysis constitutes 3% or more, preferably 5% or more, most preferably 10% or more of the total heat of fusion QII (cal/g-copolymer), the block copolymer according to the invention becomes also further advantageous with respect to the balance between heat resistance and impact resistance and/or between heat resistance and softness.

The fusion properties based on the DSC analysis in the invention are determined by the following measuring methods.

With the use of differential scanning calorimeter "Model No. SDC-2" manufactured by Perkin-Elmer, 5 mg of the copolymer sample is heated and fused for 3 minutes in a gaseous nitrogen stream at 250° C., the sample is cooled to 60° C. at a cooling rate of 10° C./minute to crystallization and is then fused at a heating rate of 10° C./minute, whereupon a thermogram is obtained. The temperatures corresponding to the peaks are read out from this thermogram, and the read out values constitute the fusion peak temperatures. On the other hand, with regard to heat of fusion, a thermogram is obtained by using indium as a standard material whose heat of fusion is known, and the base line is used for determining the area included between these two lines thereby to fix the heat of fusion per area unit, which is then applied to the area obtained from the thermogram of the copolymers according to the invention thereby to determine the heat of fusion thereof.

(3) Production of block copolymers

The propylene block copolymers can be produced by a first step wherein propylene in the weight corresponding to 0.5-50% of the total weight of the polymerization is homopolymerized in the presence of a catalyst for stereoregular polymerization and by a second step wherein propylene and the unsaturated hydrocarbon compound in the weight corresponding to 50-99.5% of the total weight of polymerization are copolymerized under the condition of simultaneous presence of both the monomers.

The weight of the propylene in the homopolymerization of the first step is preferably 2-30%, more preferably 5-20%, of the total weight of the polymerization. Consequently, the weight of the propylene in the random copolymerization between propylene and said unsaturated hydrocarbon is preferably 98-70%, more preferably 95-80%, of the total weight of the polymerization.

In the case where the propylene and said unsaturated hydrocarbon are random-polymerized in the first step, and then the propylene is homopolymerized in the second step, the copolymer formed is not only inferior to that obtained in the reverse sequence of steps with respect to the balance between stiffness and heat resistance and between heat resistance and impact resistance but also has a lower powder bulk density. Further, when the polymerization is carried out in a hydrocarbon solvent such as n-hexane or n-heptane, the forming of undesirable dissolved substances in the solvents is increased.

The polymerization can be carried out under a pressure in the range of atmospheric pressure to 100 atm., preferably atmospheric pressure to 30 atm., in either a continuous or batch system. In the case of a continuous system, it is preferable that two or more reactors are used, and the first reactor is used for the propylene homopolymerization, and the second and further reactors are used for the random copolymerization in the simultaneous presence of propylene and said unsaturated hydrocarbon. In the case of a batch system, the propylene homopolymerization is carried out in the first step, and then propylene is purged out of system, or otherwise propylene is left therein to carry out the random copolymerization between propylene and said unsaturated hydrocarbon compound. In the usual random polymerization between the propylene and said unsaturated hydrocarbon compound, the propylene and the unsaturated hydrocarbon compound are supplied continuously, or otherwise said unsaturated hydrocarbon compound is first supplied totally, and then the propylene is supplied continuously.

In the polymerization according to the invention, after the first step has been carried out at 0°-80° C., the second step is advantageously carried out at a temperature which is higher than that of the first step by at least 5° C. and is in the range between 40° C.-100° C. More specifically, the unsaturated hydrocarbon compound is remarkably less reactive than the propylene in the random polymerization with the propylene, so that on an industrial base, the increase of conversion of the unsaturated hydrocarbon compound constitutes an important problem. We have found the following facts for the solution of this problem. When the copolymerization is carried out at the higher temperature range of 40°-100° C., preferably 60°-90° C., most preferably 70°-90° C., the increase of reactivity of the unsaturated hydrocarbon compound is remarkably higher than the increase of reactivity of the propylene. On the other hand, when the polymerization is carried out at the higher range of temperatures, the bulk density of powder is decreased, while at the same time the quantity of dissolved material in the solvent such as n-hexane or n-heptane used for the polymerization process is remarkably increased. However, when the homopolymerization of the propylene is carried out prior to the random copolymerization of the propylene with the unsaturated hydrocarbon compound and at a temperature which is lower than that of the random copolymerization by 5° C. in a range between 0°–80° C., preferably 30°–70° C., most preferably 40°–60° C., the powder bulk density of the copolymer formed is greatly increased, and at the same time the quantity of dissolved materials in the hydrocarbon solvents such as n-heptane or n-hexane used for the polymerization is greatly decreased.

4. Other Remarks

Of course, the copolymers according to the invention can contain such various adjuvants which the olefin copolymer can usually contain as talc, calcium carbonate, mica, glass fiber, wallastonite and other inorganic fillers, nylon, polyethylene terephthalate, polystyrene and other thermoplastic resins. Further, the copolymers according to the invention can, of course, be used in the form of blends with other compatible and/or miscible resin materials.

The propylene copolymers described above and the propylene block copolymers as shown in the specific examples according to the invention described below can be employed as described above, but these copolymers can be used also as a layer of a laminated structure with a layer of metal foil or of another resin. The resin in accordance with the present invention is advantageously used as a layer of a laminated structure because it has a transmission of oxygen gas, P, which is $1 \times 10^{-10}$ (cm$^3$ STP) (cm)/(cm$^2$) (sec.) (cmHg) or lower. The value P means a volume on the basis of 0° C. and 1 atm of oxygen gas which has substantially passed across a resin layer 1 cm thick of a cross-section of 1 cm$^2$ during 1 second under the pressure differential of 1 cmHg.

In order to indicate more clearly the nature and utility of this invention, the following examples and comparison examples are set forth.

5. EXAMPLES

EXAMPLE A1

2.3 liters (l) of n-heptane was supplied into an 8-liter stainless-steel polymerization vessel provided with agitation vanes. Then, after ample purging of the vessel atmosphere with nitrogen, 1.5 gram (g) of diethylaluminum chloride (DEAC) and 0.3 g of a titanium trichloride catalyst (TAU manufactured by the Marubeni Solvay Chemical Co., Japan) was introduced into the vessel. The process temperature was set at 70° C., and in a propylene atmosphere at a pressure of one atmosphere (absolute pressure), 250 g of 4-methyl-1-pentene was introduced in one lot into the vessel. At the same time, propylene was supplied at a rate of 75 g/hour into the vessel for 6 hours thereby to carry out random copolymerization of the propylene and the 4-methyl-1-pentene.

The concentrations of the propylene and the 4-methyl-1-pentene at the start of the copolymerization were respectively 0.012 (g/g-heptane) and 0.16 (g/g-heptane). The concentrations at the time of completion of the copolymerization were similarly 0.057 (g/g-heptane) and 0.096 (g/g-heptane). Therefore, the following values of R were obtained. Rmax=13.3 (at start of copolymerization). Rmin=1.68. Rmax/Rmin=7.92.

Upon completion of the polymerization, the catalyst was decomposed with excessive methanol and repeatedly washed with n-heptane. After separation by filtration, the polymer thus obtained was dried in a vacuum at 90° C. for 24 hours. The results of measurements of the physical properties of the copolymer thus obtained are shown in Table A1.

In these measurements, the content of the unit of 4-methyl-1-pentene in the copolymer was determined from the absorbance at a wave number of 920 cm$^{-1}$ with an infrared ray absorption spectrum. The fusing characteristic based on the DSC of the copolymer was measured under the following conditions. A Model DSC-2 manufactured by the Perkin-Elmer Company was used. After a 5-mg sample of the copolymer was fused by heating in a stream of nitrogen at 250° C. for 3 minutes, the sample was cooled to 60° C. at a cooling rate of 10° C./min. to crystallize. These crystals were further fused by heating with a temperature rise rate of 10° C./min. The quantity of heat of fusion of the copolymer was determined from a fusing curve (thermograph) based on the DSC by using indium as a standard substance.

EXAMPLE A2

Copolymerization was carried under the conditions specified in Example A1 except for the quantities of 10.5 g of DEAC, 2.1 g of titanium trichloride, and 550 g of 4-methyl-1-pentene and the supplying of propylene in a manner such that the pressure was 1.0 atmosphere (absolute pressure) throughout the copolymerization.

The concentrations of the propylene and the 4-methyl-1-pentene with respect to the heptane at the start of the copolymerization were respectively 0.012 (g/g-heptane) and 0.35 (g/g-heptane). The concentrations at the time of completion of the copolymerization were similarly 0.012 (g/g-heptane) and 0.16 (g/g-heptane). Therefore, the following values of R were obtained. Rmax=29.2 (at start of copolymerization). Rmin=13.3 (at completion of copolymerization). Rmax/Rmin=2.19.

The results of measurements are set forth in Table A1.

EXAMPLE A3

Copolymerization was carried out by the procedure of Example A2 except for the use of 11.5 g of DEAC, 2.3 g of titanium trichloride, and 600 g of 4-methyl-1-pentene.

The concentrations of the propylene and the 4-methyl-1-pentene with respect to the heptane at the start of the copolymerization were 0.012 (g/g-heptane) and 0.38 (g/g-heptane), respectively. The concentrations at the time of completion of the copolymerization were similarly 0.012 (g/g-heptane) and 0.13 (g/g-heptane). Therefore, Rmax was 31.7 (at start of copolymerization); Rmin was 10.8 (at completion of copolymerization); and Rmax/Rmin was 2.92.

The results of measurement are set forth in Table A1.

EXAMPLE A4

Copolymerization of propylene and 4-methyl-1-pentene was carried out under the conditions of Example A1 except for a feed quantity of 190 g of the 4-methyl-1-pentene.

The concentrations of the propylene and the 4-methyl-1-pentene at the start of the copolymerization were 0.012 (g/g-heptane) and 0.12 (g/g-heptane), respectively. The concentrations at the time of completion of the copolymerization were respectively 0.049 and 0.106 (g/g-heptane). Therefore, Rmax was 10.0 (at the start of copolymerization); Rmin was 2.16 (at the completion of copolymerization); and Rmax/Rmin was 4.62.

The results of measurements are shown in Table A1.

EXAMPLE A5

Copolymerization was carried out under the conditions of Example A3 except for a feed quantity of the 4-methyl-1-pentene of 800 g.

The concentrations of the propylene and the 4-methyl-1-pentene at the start of the copolymerization were 0.012 (g/g-heptane) and 0.52 (g/g-heptane), respectively. The concentrations at the completion of copolymerization were similarly 0.012 (g/g-heptane) and 0.20 (g/g-heptane). Therefore, Rmax was 43.3 (at the start of copolymerization); Rmin was 16.7; and Rmax/Rmin was 2.59.

The results of measurements are shown in Table A1.

COMPARISON EXAMPLE A1

From the upper part of a polymerization vessel, n-heptane was continuously supplied thereinto at a rate of 0.67 liter/hour. Through the bottom part of the polymerization vessel, polymer slurry was continuously drained out of the vessel at a rate such that the quantity of the polymer slurry in the vessel was continually maintained at 4.0 liters. Diethylaluminum chloride and titanium trichloride was supplied into the vessel at respective rates such that their concentrations in the vessel were constantly maintained at 0.65 g/l and 0.13 g/l, respectively. Propylene and 4-methyl-1-pentene were respectively supplied into the vessel at rates of 190 g/hour and 250 g/hour.

Except for the above conditions, the procedure of Example A1 was followed in carrying out copolymerization. The physical properties of the polymer obtained after the reaction reached a steady state were measured. The results were as set forth in Table A1. That the ratio Rmax/Rmin in the instant comparison example was one (unity) will be self-evident.

COMPARISON EXAMPLES A2 AND A3

Copolymerization was carried out under the conditions of Comparison Example A1 except for the supply of the 4-methyl-1-pentene at rates of 1,000 and 1,500 g/hour. It will be self-evident that the ratio Rmax/Rmin in each of the instant comparison examples was one (unity). The fusing characteristics of the copolymers thus obtained are shown in Table A1.

EXAMPLE A6

Random copolymerization of propylene and 4-methyl-1-pentene was carried out under the conditions of Example A1 except for a copolymerization temperature of 50° C.

The concentrations of the propylene and the 4-methyl-1-pentene with respect to the heptane were 0.023 and 0.16 (g/g-heptane), respectively, at the start of the copolymerization and were similarly 0.078 and 0.107 (g/g-heptane), respectively, at the completion of the copolymerization. Therefore, Rmax was 6.96 (at the start of the copolymerization); Rmin was 1.37 (at the completion of the copolymerization); and Rmax/Rmin was 5.08.

EXAMPLE A7

Random copolymerization of propylene and 4-methyl-1-pentene was carried out under the conditions of Example A1 except for the addition in one lot of hydrogen at a rate of 25 cc/hour (based on 0° C. and 1 atmosphere) during the copolymerization period The concentrations with respect to the heptane of the propylene and the 4-methyl-1-pentene were 0.012 and 0.16 (g/g-heptane), respectively, at the start of the copolymerization and were similarly 0.044 (g/g-heptane) at the completion of the copolymerization. Therefore, Rmax was 13.3 (at the start of the copolymerization); Rmin was 2.14 (at the completion of the copolymerization); and the ratio Rmax/Rmin was 6.21.

EXAMPLE A8

Random ternary copolymerization of propylene, ethylene, and 4-methyl-1-pentene was carried out under the conditions of Example A3 except for the supplying of the ethylene at a rate of 2.5 g/hour for 6 hours simultaneously with the propylene.

The concentrations with respect to the heptane of the propylene and the 4-methyl-1-pentene were 0.012 and 0.38 (g/g-heptane), respectively, at the start of the copolymerization and similarly 0.012 and 0.12 (g/g-heptane), respectively, at the completion of the copolymerization. Therefore, Rmax was 31.7 (at the start of the copolymerization); Rmin was 10.0 (at the completion of the copolymerization); and the ratio Rmax/Rmin was 3.17.

The results of measurements are set forth in Table A1.

EXAMPLE A9

Random ternary copolymerization of propylene, ethylene, and 4-methyl-1-pentene was carried out under the conditions of Example A3 except for the supplying of the ethylene at a rate of 10 g/hour for 6 hours simultaneously with the propylene.

The concentrations with respect to the heptane of the propylene and the 4-methyl-1-pentene were 0.011 and 0.38 (g/g-heptane), respectively, at the start of the copolymerization and were 0.011 and 0.10 (g/g-heptane), respectively, at the completion of the copolymerization. Therefore, Rmax was 9.09 (at the start of the copolymerization); Rmin was 2.20 (at the completion of the copolymerization); and the ratio Rmax/Rmin was 6.05.

The results of measurements are shown in Table A1.

EXAMPLE A10

4 liters of n-heptane was fed into a polymerization vessel exactly as specified in Example A1, and, after the atmosphere in the vessel was purged with nitrogen, 5.3 g of DEAC and 0.9 g of titanium trichloride (identical to that used in Example A1) were introduced into the vessel. The vessel interior temperature was set at 70° C., and, in a propylene atmosphere therewithin of one atmosphere (absolute pressure), 750 g of 3-methyl-1-butene was introduced in one lot into the vessel. Immediately thereafter, random copolymerization of the propylene and the 3-methyl-1-butene was carried out as propylene was supplied at a rate of 190 g/hour into the vessel over 6 hours.

The concentrations with respect to the heptane of the propylene and the 3-methyl-1-butene at the start of the copolymerization were 0.012 and 0.46 (g/g-heptane), respectively, and were similarly 0.038 and 0.29 (g/g-heptane), respectively, at the completion of the copolymerization. Therefore, Rmax was 38.3 (at the start of the copolymerization); Rmin was 7.63 (at the completion of the copolymerization); and the ratio Rmax/Rmin was 5.02.

The results of measurements are shown in Table A1. The measurements were carried out as specified in Example A1 except that, in the determination of the fusing characteristic by DSC, the copolymer was heated up to 290° C.

EXAMPLE A11

Random copolymerization of propylene and styrene was carried out similarly as in Example A1 except for the use of 3 g of DEAC and 0.6 g of titanium trichloride and the use of 450 g of styrene instead of 250 g of 4-methyl-1-pentene.

The concentrations with respect to the heptane of the propylene and the styrene were 0.012 and 0.29 (g/g-heptane), respectively, at the start of the copolymerization and were similarly 0.060 and 0.21 (g/g-heptane), respectively, at the completion of the copolymerization. Therefore, Rmax was 24.2 (at the start of the copolymerization); Rmin was 3.50 (at the completion of the copolymerization); and the ratio Rmax/Rmin was 6.9.

The results of measurements are shown in Table A1.

EXAMPLE A12

Into a 500-ml glass flask having a magnetic stirrer and a reflux condenser, 100 ml of n-heptane was introduced. Then after the flask was thoroughly purged with nitrogen, 150 mg of DEAC and 30 mg of titanium trichloride were placed therein. The interior temperature of the flask was set at 70° C., and the atmosphere was changed to propylene (at atmospheric pressure). Then 10 g of p-methylstyrene was added in one lot. Thereafter copolymerization was carried out for 6 hours as the propylene pressure was maintained at atmospheric pressure.

The concentrations with respect to the heptane of the propylene and the p-methylstyrene was 0.012 and 0.15 (g/g-heptane), respectively, at the start of the copolymerization and were similarly 0.012 and 0.12 (g/g-heptane), respectively, at the completion of the copolymerization. Accordingly, Rmax was 12.5 (at the start of copolymerization); Rmin was 10.0 (at the completion of the copolymerization); and the ratio Rmax/Rmin was 1.25.

The results of measurements are given in Table A1.

EXAMPLE A13

Copolymerization was carried out under the conditions of Example A12 except for the use of 25 g of 3,5,5-trimethyl-1-hexene in place of the 10 g of p-methylstyrene.

The concentrations with respect to the heptane of the propylene and the 3,5,5-trimethyl-1-hexene were 0.012 and 0.37 (g/g-heptane), respectively, at the start of the copolymerization and were similarly 0.012 and 0.29 (g/g-heptane), respectively, at the completion of the copolymerization. Accordingly, the Rmax was 30.8 (at the start of the copolymerization); Rmin was 24.2 (at the completion of the copolymerization); and the ratio Rmax/Rmin was 1.27.

The results of measurements are shown in Table A1. The fusing characteristic by DSC was measured similarly as in Example A1 except that the copolymer was heated up to 290° C.

TABLE A1

| | Exam. A1 | Exam. A2 | Exam. A3 | Exam. A4 | Exam. A5 | Com. Exam. A1 | Com. Exam. A2 | Com. Exam. A3 | Exam. A6 | Exam. A7 | Exam. A8 | Exam. A9 | Exam. A10 | Exam. A11 | Exam. A12 | Exam. A13 |
|---|---|---|---|---|---|---|---|---|---|---|---|---|---|---|---|---|
| Monomer B Kind | 4-methyl-1-pentene | " | " | " | " | " | " | " | " | " | " | " | 3-methyl-1-butene | styrene | p-methyl-styrene | 3,3,5-trimethyl-1-hexene |
| Content (% by weight) | 10.2 | 29.5 | 60.2 | 5.4 | 81.5 | 9.5 | 35.4 | 58.2 | 8.4 | 9.8 | 58.4 | 54.3 | 32.1 | 16.8 | 14.3 | 41.6 |
| Kind - Monomer C | — | — | — | — | — | — | — | — | — | — | ethylene | ethylene | — | — | — | — |
| Content (% by weight) | — | — | — | — | — | — | — | — | — | — | 1.8 | 5.7 | — | — | — | — |
| Rmax | 13.3 | 29.2 | 31.7 | 10.0 | 43.3 | — | — | — | 6.96 | 13.3 | 32.1 | 34.5 | 38.3 | 24.2 | 12.5 | 30.8 |
| Rmin | 1.68 | 12.7 | 10.8 | 2.16 | 16.7 | — | — | — | 1.37 | 2.14 | 10.0 | 9.09 | 7.63 | 3.50 | 10.0 | 24.2 |
| Rmax/Rmin | 7.92 | 2.30 | 2.92 | 4.62 | 2.59 | — | — | — | 5.08 | 6.21 | 3.17 | 3.80 | 5.02 | 6.91 | 1.25 | 1.27 |
| Fusion peak temp. (°C.) | 142.5 | 154.2 | 156.5, 233.6, 239.5 | 158.0 | 155.8, 239.3, 243.4 | 141.2 | 132.4 | 119.5 | 146.1 | 143.5 | 142.4, 220.3 | 133.5, 214.0 | 158.2, 277.4, 285.2 | 155.6 | 156.8 | 159.3, 279.0 |
| ΔQ ≦ 140 (%) | 32 | 36 | 4.3 | 6.2 | 8.2 | 82 | 90 | 100 | 29 | 31 | 24 | 24 | 11 | 35 | 15 | 5.1 |
| ΔQ ≦ 150 (%) | 48 | 40 | 82 | 70 | 86 | 1.8 | 0.8 | 0 | 55 | 50 | 54 | 73 | 64 | 42 | 47 | 79 |
| Limiting viscosity (in decalin, 135° C.) | 3.22 | 3.14 | 2.94 | 3.31 | 2.62 | 3.16 | 3.01 | 2.98 | 4.84 | 1.61 | 3.13 | 3.53 | 2.58 | 3.64 | 3.41 | 3.10 |

Note: A plurality of data means there are a plurality of fusion peaks.

In the following examples and comparison examples, unless particularly specified, the Olsen bending stiffness (10° angle) was measured according to ASTM D-747-70. Values such as the rate of deformation due to application of heat and pressure and the proportion with respect to the total fusing heat quantity of the fusing heat quantity of that portion fusing at a temperature of 140° C. or more in the DSC analysis were measured on the basis of the method described below.

Measurement of rate of deformation due to application of heat and pressure

The copolymer whose heat resistance is to be measured is formed into a sheet of 2-mm thickness by means such as a press or an injection molding machine. Test pieces each measuring 10 mm in length, 10 mm in width, and 2 mm in thickness are cut from this sheet.

Each test piece is placed between pressure applying plates disposed horizontally in a silicon oil bath maintained at a specific temperature (150° C.), and a specific load (1 kg) is placed on the upper pressure applying plate thereby to apply a constant force on the test piece. The quantity of deformation with the passage of time of the test piece is determined by means of a dial gage for measuring linear displacements. The rate of deformation d (%) due to the load under heat and pressure is calculated from the following equation.

$$d = \frac{\text{quantity of deformation of test piece}}{\text{test piece thickness (2 mm)}} \times 100$$

EXAMPLE B1

An 8-liter stainless-steel polymerization vessel provided with a vaned agitator was charged with 2.3 liter of n-heptane. After ample purging of the vessel with nitrogen, 1.5 g of diethylaluminum chloride and 0.3 g of titanium trichloride (TAU catalyst manufacturing by Marubeni-Solvay Chemical Company, Japan) were added thereto. The system temperature was set at 50° C., and, as propylene at a rate of 150 g/hour and hydrogen at a rate of 55 cc/hour were introduced into the vessel, homopolymerization of the propylene was carried out for 30 minutes.

Thereafter, the propylene was purged out of the system, and 300 g of 4-methyl-1-pentene was introduced in one lot into the vessel. The system temperature was then raised to 70° C., and propylene at a rate of 75 g/hour and hydrogen at a rate of 25 cc/hour were introduced into the vessel, and random copolymerization of the propylene and 4-methyl-1-pentene was carried out for 6 hours.

Upon completion of the polymerization, the catalyst was decomposed with methanol supplied in excess quantity, and the polymer formed was repeatedly washed with n-heptane. After separation by filtration, the polymer thus obtained was dried at 90° C. for 24 hours in a vacuum.

The results of measurements of the physical properties of the block copolymer thus obtained were as set forth in Table B1. The content of 4-methyl-1-pentene in the block copolymer was determined from the absorbance of absorption appearing at 920 cm$^{-1}$ in the infrared absorption spectrum. The proportion of the propylene homopolymer portion in the block copolymer was determined from the proportion (Ag/Bg)×100 (%), where Ag is the weight of the polymer obtained by carrying out only a separate propylene homopolymerization part under the same conditions as in the above described run, immediately decomposing the catalyst with methanol, and, under the same conditions as in the above-described run, carrying out washing, separation by filtration, and drying, the weight Ag being taken as the weight of the propylene homopolymerization part, and Bg is the quantity of the polymer obtained from the above described example of practice.

In the following examples and comparison examples the 4-methyl-1-pentene contents in the block copolymer and the proportions of the propylene homopolymerization parts have been determined in the same manner.

EXAMPLE B2

The procedure of Example B1 was carried except that the time of the propylene homopolymerization was 50 minutes. The properties of the polymer thus obtained are shown in Table B1.

EXAMPLE B3

The procedure specified in Example B1 was carried out except that the time of the propylene homopolymerization was 1.5 hours. The properties of the polymer thus obtained are set forth in Table B1.

COMPARISON EXAMPLE B1

The procedure specified in Example B1 was carried out except that the propylene homopolymerization time was 0 (zero) minutes. The properties of the polymer thus obtained are shown in Table B1.

EXAMPLE B4

The procedure described in Example B2 was carried out except for the use of 3.0 g of diethylaluminum chloride and 0.6 g of titanium trichloride (TAU catalyst manufactured by Marubeni-Solvay Chemical Company, Japan) and the feeding of 450 g of 4-methyl-1-pentene. The properties of the polymer thus produced are shown in Table B1.

EXAMPLE B5

The procedure of Example B4 was carried out except that the propylene homopolymerization time was 1.5 hours. The properties of the polymer thus obtained are shown in Table B1.

COMPARISON EXAMPLE B2

The procedure described in Example B4 was carried out except that the propylene homopolymerization time was 0 (zero) minutes. The properties of the polymer thus obtained are shown in Table B1.

COMPARISON EXAMPLE B3

The procedure of Example B1 was carried out except that the propylene homopolymerization time was 1.5 hours, during which the feed rates of the propylene and the hydrogen were 450 g/hour and 150 cc/hour, respectively, and the quantity of the 4-methyl-1-pentene initially fed in the random copolymerization was 400 g. The properties of the polymer thus obtained are shown in Table B1.

EXAMPLE B6

The procedure set forth in Example B4 was carried out except for the supplying of 600 g of the 4-methyl-1-pentene. The properties of the polymer thus obtained are shown in Table B1.

The copolymer was fabricated into a laminate by a dry lamination method where film 60 microns thick of the copolymer made by a T-die casting method and having undergone corona discharge treatment on one of the surfaces stood as a first layer, aluminum foil 9 microns thick as a second layer and biaxially oriented polypropylene 12 microns thick ("DIAFOIL" manufactured by Mitsubishi Jushi, Japan). Adhesion between the laminae was effected by a polyurethan-isocyanate-based adhesive ("ADCOTE 503H" and "Catalyst F" manufactured by Toyo Morton, Japan) in a quantity of 10 g solid/m².

From the laminated structure, two 130 mm × 170 mm samples were cut out, and the samples were heat-sealed with the first layers facing into a pouch where heat sealing was carried out along the two sides of 170 mm length and the one side of 130 mm length under the conditions of 10 mm of width at 200° C. under 3 kg/cm² for 2.0 seconds. The 180° angle seal strength of the heat sealed portion was determined under the conditions of 20 mm width at a pulling speed of 500 mm/min.

Into the pouch was put 100 g of cooked curry, and the opening of the pouch was heat-sealed under the above-described conditions. The product was then put into a hot water retort can, and was retort-treated. After the treatment, the pouch with the content in it and placed horizontally was dropped from the height of 1.5 m. The number of pouches which lost their seal by generation of pinholes or tearing among 25 pouches.

On the other hand, from the pouch having undergone the retort-treatment but no drop test, a heat seal portion was cut out for determination of the heat seal strength under the above conditions.

The results obtained are as follows.
Heat sealing conditions:
temperature: 200° C.
pressure: 3 kg/cm²
time: 2 seconds
Heat seal strength before retort treatment: 7.1 kg/20 mm
Retort treatment conditions:
  temperature and time: 140° C./10 min.
  temperature and time: 160° C./5 min.
After retort treatment:
  heat seal strength: 6.6 kg/20 mm (140° C./10 min.)
  heat seal strength: 6.6 kg/20 mm (160° C./5 min.
  drop test: 0 pouch/25 pouches (140° C./10 min.)
  drop test: 0 pouch/25 pouches (160° C./5 min.)

EXAMPLE B7

The procedure described in Example B6 was carried out except that the propylene homopolymerization time was 1.5 hours. The properties of the polymer thus obtained are shown in Table B1.

COMPARISON EXAMPLE B4

The procedure of Example B4 was carried out except that the propylene homopolymerization time was 1.5 hours, during which the feed rates of the propylene and the hydrogen were 450 g/hour and 150 cc/hour, respectively, and the quantity of the 4-methyl-1-pentene initially fed in the random copolymerization was 780 g. The properties of the polymer thus obtained are shown in Table B1.

COMPARISON EXAMPLE B5

The procedure of Example B6 was carried out except that the propylene homopolymerization time was 0 (zero) minutes. The properties of the polymer thus obtained are shown in Table B1.

TABLE B1

| | Example B1 | Example B2 | Example B3 | Com. Example B1 | Example B4 | Example B5 | Com. Example B2 | Com. Example B3 | Example B6 | Example B7 | Com. Example B4 | Com. Example B5 |
|---|---|---|---|---|---|---|---|---|---|---|---|---|
| Proportion of propylene homopolymerization part in block copolymer (%) [1] | 5.8 | 9.1 | 19.5 | 0 | 10.2 | 21.4 | 0 | 62.1 | 8.9 | 20.4 | 59.8 | 0 |
| 4-methyl-1-pentene content in random copolymerization part (%)[1] | 10.1 | 9.9 | 10.3 | 10.2 | 19.6 | 19.1 | 20.0 | 21.1 | 34.1 | 35.2 | 36.2 | 34.8 |
| Limiting viscosity (dl/g, 135° C., in decalin) | 3.6 | 5.1 | 4.2 | 3.7 | 4.3 | 4.5 | 3.7 | 4.6 | 3.6 | 4.3 | 3.5 | 3.3 |
| Fusion peak temp. (°C.) | 153 | 154 | 155 | 143[2] / 151[3] | 152 | 156 | 152 | 159 | 156[2] / 235[3] | 157[2] / 235[3] | 159[2] / 235[3] | 156[2] / 235[3] |
| Total fusion heat quantity (cal/g) | 12.9 | 13.3 | 14.6 | 12.1 | 11.4 | 12.7 | 10.2 | 18.3 | 6.1 | 7.5 | 13.0 | 4.9 |
| Fusion heat quantity of part fusing at 170° C. or below (cal/g) | 12.9 | 13.3 | 14.6 | 12.1 | 11.4 | 12.7 | 10.2 | 18.3 | 5.3 | 6.6 | 12.2 | 4.7 |
| (%) | 100 | 100 | 100 | 100 | 100 | 100 | 100 | 100 | 87 | 89 | 94 | 83 |
| Fusion heat quantity of part fusing at 145° C. or above (cal/g) | 8.0 | 8.4 | 9.5 | 7.4 | 5.1 | 6.6 | 4.0 | 12.3 | 2.9 | 4.0 | 8.5 | 1.7 |
| (%) | 62 | 63 | 65 | 61 | 45 | 52 | 39 | 67 | 48 | 53 | 65 | 35 |
| Deformation rate under heating & pressure (%) (150° C., 1 kg/cm², during 60 minutes) | 14.5 | 14.9 | 11.8 | 40.8 | 19.4 | 16.4 | 58.2 | 10.4 | 10.0 | 1.6 | 5.1 | 20.2 |
| Olsen bending stiffness (10° angle) | | | | | | | | | | | | |

TABLE B1-continued

|  | Example-B1 | Example-B2 | Example-B3 | Com. Example-B1 | Example-B4 | Example-B5 | Com. Example-B2 | Com. Example-B3 | Example-B6 | Example-B7 | Com. Example-B4 | Com. Example-B5 |
|---|---|---|---|---|---|---|---|---|---|---|---|---|
| (Kg/cm²) | 5,870 | 5,980 | 6,100 | 5,780 | 3,940 | 4,030 | 3,800 | 7,700 | 5,470 | 5,540 | 8,100 | 5,450 |

*1 % by weight
*2 Fusion peak indicating minimum temperature
*3 Fusion peak indicating maximum temperature

EXAMPLES B8 and B9

The procedures of Examples B4 and B5 were carried out except for the use of styrene in place of the 4-methyl-1-pentene in the same weight quantity. The properties of the polymers thus obtained are shown in Table B2.

COMPARISON EXAMPLE B6

The procedure of Comparison Example B2 was carried out except for the use of styrene in place of the 4-methyl-1-pentene in the same weight quantity. The properties of the polymer thus obtained are set forth in Table B2.

TABLE B2

|  | Example B8 | Example B9 | Example B6 |
|---|---|---|---|
| Proportion of propylene homopolymerization part in block copolymer (%) *1 | 10.2 | 21.8 | 0 |
| Styrene content in random copolymerization part (%) *1 | 18.6 | 18.2 | 19.2 |
| Limiting viscosity (dl/g, 135° C. in decalin) | 4.2 | 3.7 | 4.5 |
| Fusion peak temperature (°C.) | 156 | 158 | 155 |
| Total fusion heat quantity (cal/g) | 16.9 | 16.6 | 16.3 |
| Fusion heat quantity of part fusing at 170° C. or below (cal/g) | 16.9 | 16.6 | 16.3 |
| (%) | 100 | 100 | 100 |
| Fusion heat quantity of part fusing at 145° C. or above (cal/g) | 9.5 | 9.0 | 8.3 |
| (%) | 66 | 54 | 51 |
| Deformation rate under heating and pressure (150° C., 1 kg/cm², during 60 min.) (%) | 14.1 | 18.3 | 32.4 |
| Olsen bending stiffness (10° angle) (kg/cm²) | 6,200 | 6,180 | 6,100 |

*1: % by weight

EXAMPLE C1

2.3 liters of n-heptane was supplied into an 8-liter stainless-steel polymerization vessel provided with agitation vanes. Then, after ample purging of the vessel atmosphere with nitrogen, 7.5 of DEAC and 1.5 g of a titanium trichloride (TAU catalyst manufactured by the Marubeni Solvay Chemical Co., Japan) were introduced into the vessel. The process temperature was set at 70° C., and in a propylene atmosphere at a pressure of one atmosphere (atm) (absolute pressure), 360 g of 4-methyl-1-pentene was introduced in one lot into the vessel. At the same time, hydrogen and propylene were supplied at a rate of 350 ml (STP) and 90 g/hour, respectively, into the vessel for 6 hours thereby to carry out random copolymerization of the propylene and the 4-methyl-1-pentene.

Then, the propylene in the vessel was withdrawn until its pressure reached one atm (absolute), and the polymerization was further continued until the pressure of the remaining propylene reached 0.5 atm, 75 g/hour of ethylene was then introduced for one hour.

Upon completion of the polymerization, the catalyst was decomposed with excessive methanol and repeatedly washed with n-heptane. After separation by filtration, the polymer thus obtained was dried in a vacuum at 90° C. for 24 hours. The results of measurements of the physical properties of the copolymer thus obtained are as follows.

(1) Propylene/4-methyl-1-pentene random copolymer block
  quantity: 88 parts by weight
  content of 4-methyl-1-pentene: 10.2% by weight
(2) Ethylene/4-methyl-1-pentene random copolymer block
  quantity: 12 parts by weight
  content of ethylene: 95.8% by weight
(3) Limiting viscosity (135° C. in decalin): 3.1
(4) Fusion peak temperature:
  150° C.*1
  119° C.*2
(5) Deformation rate under heating and pressure (150° C., 1 kg/cm², 60 min.): 34.2%
(6) Olsen bending stiffness (10° angle): 5300 kg/cm²
(7) Charpy impact strength (−20° C.): 9.0 kg-cm/cm²

*1 Fusion peak indicating maximum temperature
*2 Fusion peak indicating minimum temperature

What is claimed is:

1. A propylene block copolymer having a propylene content of 30–97 mol %, a limiting viscosity in decalin at 135° C. of 0.3 to 15 dl/g, and consisting essentially of (a) 0.5 to 50 percent by weight of a propylene homopolymer portion and (b) 99.5 to 50 percent by weight of a propylene random copolymer of propylene and 4-methyl-1-pentene, and in which the heat of fusion of the copolymer QIII (cal/g-copolymer) at 170° C. at the highest based on a DSC and the content C of 4-methyl-1-pentene in percent by weight satisfy the following equation:

$$Q\,III < 0.18\,(100-C).$$

2. The propylene block copolymer as claimed in claim 1 in which a fusion curve based on a DSC has a plurality of peaks, and the fusion peak showing the lowest temperature is at 145° C. at the lowest and the fusion peak showing the highest temperature is at 170° C. at the lowest.

3. The propylene block copolymer as claimed in claim 1 in which a heat of fusion of the copolymer QV (cal/g-copolymer) of the portion of the copolymer which fuses in a temperature range not lower than 170° C. based on a DSC is at least 3 percent of the total heat of fusion QII (cal/g-copolymer) of the copolymer.

4. A process for producing a propylene block copolymer in a two stage polymerization, which copolymer has a limiting viscosity in decalin at 135° C. of 0.3 to 15 dl/g, a propylene content of 30–97 mol % and which consists essentially of (a) 0.5 to 50 percent by weight of a propylene homopolymer block and (b) 99.5 to 50 percent by weight of a block of a propylene random copolymer of propylene and 4-methyl-1-pentene and in which the heat of fusion, of the copolymer QIII (cal/g-copolymer) at 170° C. at the highest based on a DSC and the content C of 4-methyl-1-pentene in percent by weight satisfy the following equation:

Q III < 0.18 (100-C), which process comprises, in the presence of a stereoregular catalyst, homopolymerizing propylene in a quantity corresponding to 0.5 to 50 percent by weight of the total polymerization at the first stage of polymerization and copolymerizing propylene and 4-methyl-1-pentene in a quantity corresponding to 50 to 99.5 percent by weight at the second stage of polymerization.

5. The process for producing a propylene block copolymer as claimed in claim 4 in which the first stage of polymerization is conducted at a temperature in the range of 0° to 80° C. and the second stage of polymerization is then conducted at a temperature which is higher than that at the first stage of polymerization by at least 5° C. and which is in the range of 40° to 100° C.

6. The process for producing a propylene block copolymer as claimed in claim 4 in which the second stage of polymerization is conducted under such conditions that the ratio of R of the concentration of 4-methyl-1-pentene to the concentration of propylene in the course of the copolymerization is varied from Rmax to Rmin wherein Rmax and Rmin are the maximum and minimum values of R, respectively, in the course of copolymerization and Rmax/Rmin is higher than 1.5.

* * * * *